(12) United States Patent
Kuwamoto et al.

(10) Patent No.: US 6,216,954 B1
(45) Date of Patent: Apr. 17, 2001

(54) CARD READER

(75) Inventors: Yoshinobu Kuwamoto, Kumamoto; Isao Egami, Tamana; Koji Ipposhi, Yamaga; Hidekazu Hata, Kumamoto; Sumio Tate, Kasuga, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/199,336

(22) Filed: Nov. 25, 1998

(30) Foreign Application Priority Data

Nov. 28, 1997 (JP) .................................................. 9-327415

(51) Int. Cl.⁷ ............................... G06K 7/00; G06K 19/06
(52) U.S. Cl. ......................................... 235/486; 235/492
(58) Field of Search ..................................... 235/380, 482, 235/486, 488, 491, 382, 382.5, 492, 493; 902/25; 340/825.31, 825.34; 343/700 MS, 741, 895

(56) References Cited

U.S. PATENT DOCUMENTS

| 4,354,099 | * | 10/1982 | Rayment et al. | 340/825.34 |
| 4,742,215 | * | 5/1988 | Daughters et al. | 235/487 |
| 5,175,418 | * | 12/1992 | Tanaka | 235/492 |
| 5,382,781 | * | 1/1995 | Inoue | 235/384 |
| 5,917,177 | * | 6/1999 | Owa et al. | 235/486 |
| 5,932,869 | * | 8/1999 | Gottlich et al. | 235/493 |
| 6,000,607 | * | 12/1999 | Ohki et al. | 235/379 |
| 6,024,286 | * | 2/2000 | Bradley et al. | 235/492 |

FOREIGN PATENT DOCUMENTS

| 0 435 137 | | 7/1991 | (EP) . |
| 2 308 213 | | 6/1997 | (GB) . |
| 5-217032 | | 8/1993 | (JP) . |
| 6-036087 | | 2/1994 | (JP) . |
| 6-096300 | | 4/1994 | (JP) . |
| 11-120304 | * | 4/1999 | (JP) . |
| 93/02430 | | 2/1993 | (WO) . |
| WO 9746964 | * | 12/1997 | (WO) . |

OTHER PUBLICATIONS

Patent Abstracts of Japan, vol. 011, No. 311 (P–625), Oct. 12, 1987 & JP 62 102384 A (Toshiba Corp), May 12, 1987.

* cited by examiner

*Primary Examiner*—Karl D. Frech
*Assistant Examiner*—Larry D Taylor
(74) *Attorney, Agent, or Firm*—Wenderoth, Lind & Ponack, L.L.P.

(57) ABSTRACT

A card reader is provided inside of a body cover which has a card transfer path, a card transfer mechanism including a series of card transfer rollers and driven rollers, and a second antenna unit defining a wireless communication device which is positioned between the card transfer path and the body cover (1). Thus, wireless transmission and reception of data can be executed with the second antenna unit by bringing a card having a first antenna unit in close proximity to a card access area provided on the body cover, and also by inserting the card in the card transfer path.

20 Claims, 8 Drawing Sheets

FIG. 11 PRIOR ART ly shielding effect or an electrostatically chargeable

CARD READER

FIELD OF THE INVENTION

The present invention relates to a card reader capable of reading data from and/or writing data to a card by wireless transmission.

BACKGROUND OF THE INVENTION

Figure 11:
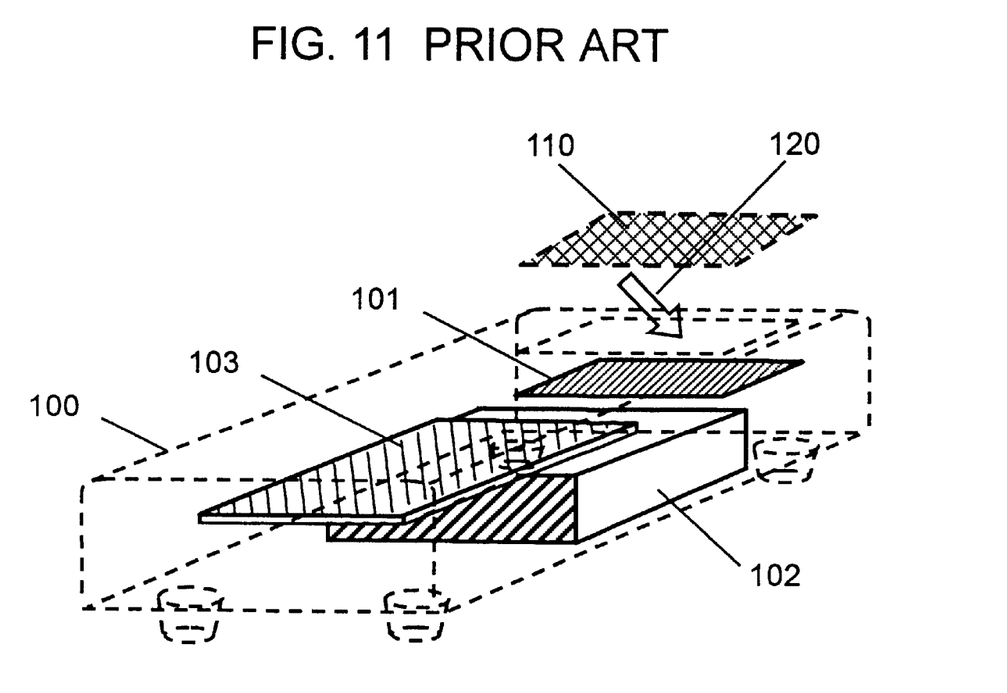
FIG. 11 is a perspective view showing a prior art card reader.

FIG. 11 is a perspective exterior view of a prior art card reader. Referring to FIG. 11, an antenna unit 101 for transmitting and receiving signals, a power supply circuit 102, and a control circuit 103 are enclosed within a main body 100.

When a card 110 (enclosing an antenna unit and an integrated circuit element inside) is brought in close proximity to the main body 100, in a direction of an arrow 120, signals are exchanged by means of a magnetic field between the antenna unit 101 enclosed in the main body 100 and the antenna unit enclosed in the card 110, so as to convert or erase data within a memory in the integrated circuit element ("IC"), or to store data from the main body 100 into the IC inside of the card 110.

Card readers of the type described above are utilized as input/output devices of systems that deal with commuting passes, prepaid cards, etc., since the data in a card 110 can be rewritten by simply bringing the card 110 in near proximity to the main body 100.

Also, another prior art card reader is provided with a card transfer path, through which a card is transferred by transfer rollers, etc. to a predetermined position, and signals are exchanged at the position between an antenna unit inside the card reader and an antenna unit in the card.

While the above prior art structure is convenient because it carries out communication between the card 110 and the main body 100 by simply bringing the card 110 near to the main body 100, it is also inconvenient, on the other hand, since the card 110 does not provide a visible display of data that are stored in the card, for example, the balance of money left for the card in the case of a system for processing a prepaid card.

Although a card reader of the type having a card transfer path can store information for visible display, they are not suitable for application in a system for handling commuting passes (including passenger tickets), etc., because they take time to transfer the cards and are slow to process the cards when used for the sole purpose of exchanging data between the cards and the card readers.

SUMMARY OF THE INVENTION

An object of the present invention is to provide a card reader, which is capable of communicating data by bringing a card in close proximity to a body of the card reader and also by having the card travel through a card transfer path, both within one body.

The card reader of the present invention has a body cover, a card transfer path provided within the body cover, a transfer means for transferring a card inserted in the card transfer path and a wireless communication means for communicating with the card in wireless transmission. With this structure, the card reader is able to execute communication between the card inserted in the card transfer path and the wireless communication means, and communication between the wireless communication means and the card when the card is brought into close proximity to the body cover.

BRIEF DESCRIPTION OF THE DRAWINGS

FIG. 4A is a plan view and

FIG. 4C is a plan view and

DETAILED DESCRIPTION OF THE PREFERRED EMBODIMENTS

Card readers of preferred embodiments of the present invention are described hereinafter with reference to the drawing figures.

Figure 1:
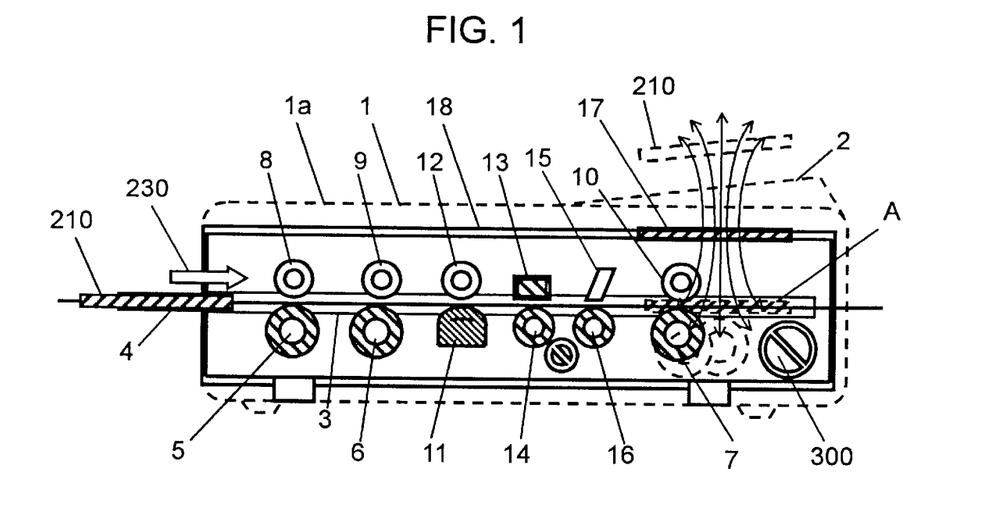
FIG. 1 is a cross sectional side view showing a card reader constructed in accordance with a preferred embodiment of the present invention.
Figure 2:
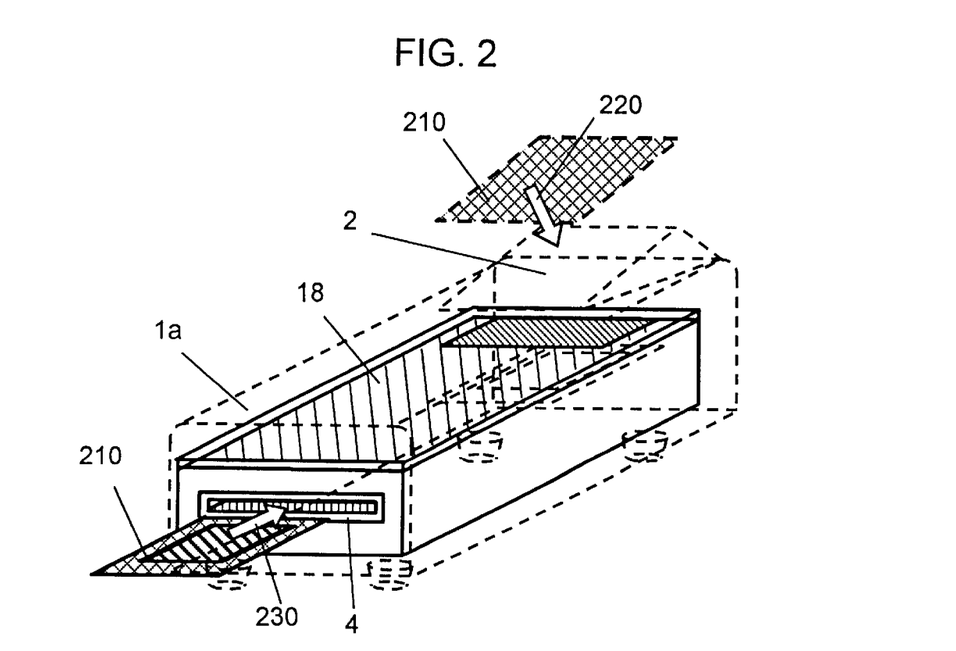
FIG. 2 is a perspective view showing an exterior of the card reader of the preferred embodiment of the present invention.

Referring to FIG. 1 and FIG. 2, it is preferable to compose a body cover 1 with a material that does not have an effect of a magnetic shield and is not statically chargeable. If the body cover 1 is composed of a material having a magnetically shielding effect or an electrostatically chargeable material, signals may not be transmitted or received properly, when the signals are carried to and from a card 210 by electromagnetic induction or electrostatic coupling as will be described hereinafter. However, if the card reader generates a strong magnetic field or electrostatic field, the material may have a magnetically shielding effect or may be statically chargeable to a certain extent. Therefore, when selecting the composing material, producibility, cost and magnetic field strength as well as electrostatic field strength are taken into consideration. Polymeric resin is a good example for a material for the body cover 1, especially with respect to producibility and cost, and plastic resins such as acrylic resin, polyvinyl chloride resin, epoxy resin, etc., for example, are also practical.

The body cover 1 is provided with a card access area 2 for bringing the card 210 in close proximity to or in contact with it. The card access area 2 is slanted relative to an upper face 1a of the body cover 1. This structure allows the card 210 to get close to or in contact with the card access area 2, and makes the card access area 2 distinctive for operators to readily discern the access area. On the other hand, it is preferable to compose the card access area 2 to be nearly in the same plane with the upper face 1a, if a height of the body cover 1 is to be lowered. If this is the case, it is desirable to mark a surface within the card access area 2 of the body cover 1 with printed indicia, an adhesive label, etc.

Alternatively, the card access area 2 may be formed in a different level relative to the upper face 1a in order to distinguish a position of the card access area 2. If the card access area 2 is raised from the upper face 1a, for example, the card access area 2 is readily discernible by an operator.

Two exemplary structures of the card 210 are described next.

Figure 3A:
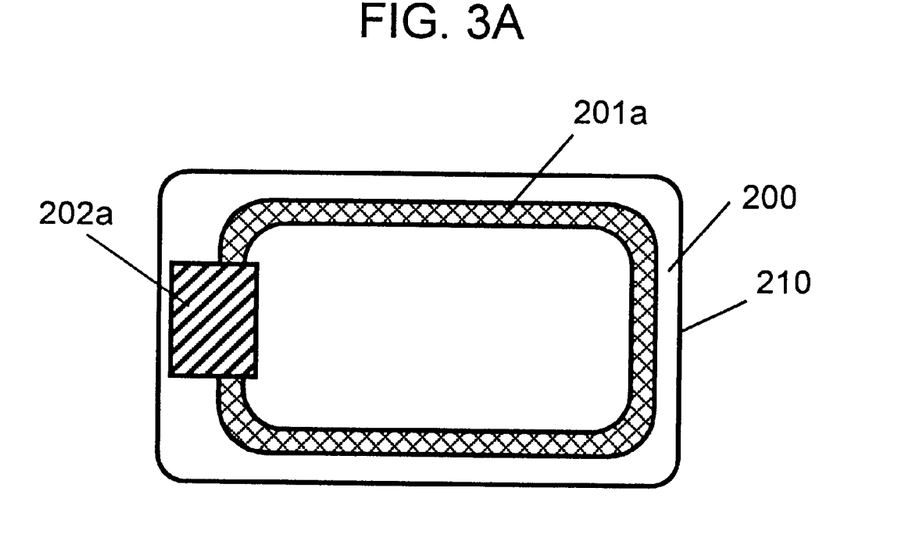
FIG. 3A is a plan view showing a card which is suitable for use with the card reader of the preferred embodiment of the present invention.

A first structure of the card 210 includes a first loop antenna unit (a coil, which is hereinafter referred to as "first antenna unit") 201a formed in a loop configuration and an integrated circuit element ("IC") 202a connected to the first antenna unit 201a. The IC 202a and the first antenna unit 201a are molded into a substrate 200 composed of a polymeric resin or a similar material as shown in FIG. 3A. When an external magnetic field, generated by a wireless communication means within the card reader, interlinks with the first antenna unit 201a, a current is induced to flow in the first antenna unit 201a. Data in a memory circuit of the IC 202a is converted, rewritten, or erased by the induced current, and this induced current can also serve as a power supply to the IC 202a.

Figure 3B:
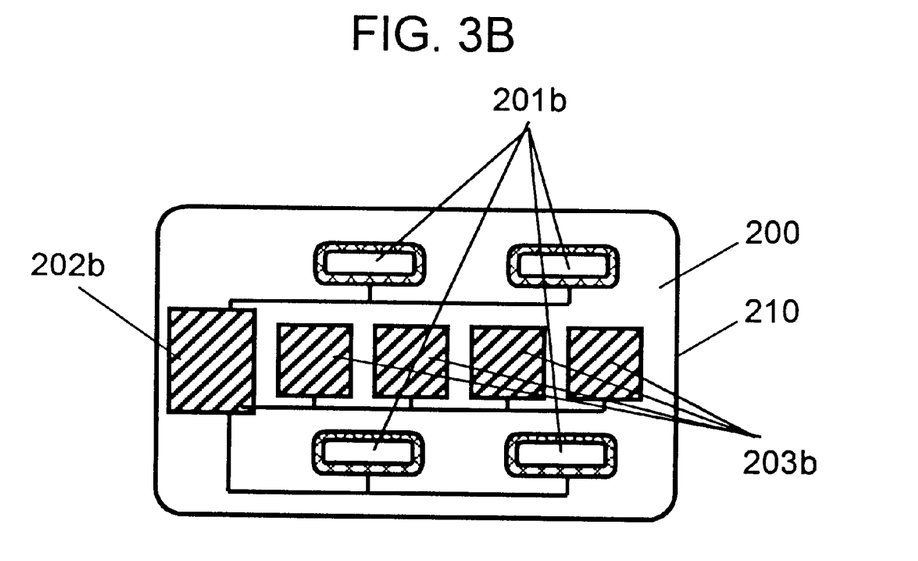
FIG. 3B is a plan view showing another card which is suitable for use with the card reader of the preferred embodiment of the present invention.

A second structure of the card 210 comprises, in conformity to an ISO standard (ISO/IEC 10536 Identification cards), first antenna units 201b formed in loop configurations, electrostatic capacitors 203b arranged in predetermined positions, and an IC 202b connected to the first antenna units 201b and the electrostatic capacitors 203b. All of the elements are molded into a substrate 200 composed of a polymeric resin or the like, as shown in FIG. 3B. When an external magnetic field is generated by the card reader, etc. interlinks with the first antenna units 201b, a current is induced to flow in the first antenna units 201b. The induced current provides a power supply for the IC 202b to operate, and at the same time, converts, rewrites, or erases data in a memory circuit of the IC 202b by variations of induced potential sign induced at terminals of the electrostatic capacitors 203b.

Cards 210 of the second structure are widely used for a reliable and sound communication between cards and card readers since communication interface is simpler, although communication distance between the card and the card reader is shorter when comparing a usable condition of the card 210 of the second structure with that of the first structure. Thus, it is desirable to bring the card 210 into contact with the card access area 2 of the body cover for communication between the card 210 of the second structure and the card reader.

The structure and operation of the card reader are now described with reference to FIG. 1. A card transfer path 3 is provided inside the body cover 1, and a card insertion port 4 is provided at one end of the card transfer path 3 for inserting the card 210 in a direction of an arrow 230.

The card transfer path 3 is provided with card transfer rollers 5, 6 and 7, and these rollers are driven so as to rotate by a driving means such as a motor 300 provided within the body cover 1. A driving force of the motor 300 is transmitted to the card transfer rollers 5, 6 and 7 by a gear, a belt, etc. which are not shown in the figures. The card transfer rollers 5, 6 and 7 are provided with opposing driven rollers 8, 9 and 10, respectively. The card 210 is transferred along the card transfer path 3 by being held between the card transfer rollers 5, 6 and 7 and the driven rollers 8, 9 and 10.

A head 11 executes at least one function of reading data from and writing data to a magnetic stripe or an optical recording medium provided on a surface of the card 210 by means of embedding or adhesion or integral molding. The head 11 is a magnetic head if a recording medium of magnetic stripe is used, or it is an optical head if an optical recording medium is used. Also, by using an image sensor or a similar device as the head 11 for reading images such as illustrations and characters formed by printing, etc. on the card 210, the images (particularly barcode, etc.) formed on the card 210 can be read for identifying a type of the card and a name of the card holder.

A driven roller 12, which opposes the head 11, presses the card 210 onto the head 11, so as to be able to execute at least one of recording and reproducing data or reading images effectively and reliably.

Obviously, if signals are exchanged with the card 210 only by the wireless means (magnetic field, etc.), the head 11 is not required and the driven roller 12 is not necessary.

An image formation unit 13, for generating an image on the card 210, records a pattern of predetermined characters and illustrations in an image recording area, which is provided on the card 210 for example. A thermal head is used for the image formation unit 13 if a heat sensitive material is provided for the image recording area of the card 210. By using a heat reversible-heat sensitive material as the heat sensitive material, patterns on the image recording area are made erasable so as to visibly display the latest information at all times. Rewritable material is used as an example of the heat reversible-heat sensitive material. The rewritable material becomes cloudy when heated to a predetermined temperature of T1 or above so as to cause a predetermined pattern to appear in the image recording area. The predetermined pattern fades out in the image recording area as the rewritable material becomes transparent when it is heated to maintain a temperature between T1 and T2, which is predetermined to be lower than T1. The rewritable material is generally composed of crystals dispersed in a polymer resin.

It is advantageous for administrative purposes to use an inkjet head for the image formation unit 13 so as to keep a record of usage of the card 210, as images on the card 210 remain semipermanently.

A platen roller 14 opposes the image formation unit 13, and the platen roller 14 presses the card 210 onto the image formation unit 13, so as to be able to produce the predetermined patterns, etc. reliably in the image recording area of the card 210. In this operation, a driving force of the motor 300 is transmitted to the platen roller 14 by a gear and a belt, which are not shown in the figures.

An erasing head 15, for which a heater of plane form is normally used, retains heat at a predetermined temperature in order to turn the image invisible, when the rewritable material is used for the image recording area of the card 210.

A platen roller 16 opposes the erasing head 15, and the platen roller 16 presses the card 210 onto the erasing head 15, so as to be able to heat the image recording area of the card 210 reliably for infallible erasing of the images. In this operation, a driving force of the motor 300 is transmitted to the platen roller 16 by a gear and a belt, which are not shown in the figures.

As a matter of course, if a write-once heat-sensitive material is used for the image recording area of the card 210, or if an inkjet head is used for the image formation unit 13, the erasing head 15 and the platen roller 16 are not necessary.

Also, the image formation unit 13, the erasing head 15 and the platen rollers 14 and 16 are not necessary, if the card 210 does not carry the image recording area.

A second antenna unit 17 is provided inside of the body cover 1 as a wireless communication means. The second antenna unit 17 is mainly in a coil form, or is a combination of coils and electrostatic capacitors corresponding to card 210 of the second structure. Data communication is made by generating a magnetic field, or a magnetic field and an electrostatic field, with electric current supplied to the second antenna unit 17. Since the second antenna unit 17 is positioned so as to oppose the card transfer path 3, a width of the body cover 1 can be reduced, thereby enabling a reduction in size of the equipment. Moreover, by positioning the second antenna unit 17 between the card access area 2 and the card transfer path 3, the second antenna unit 17 is able to perform data communication with a card 210 brought close to or in contact with (placed on) the card access area 2, as well as with a card 210 transferred through the card transfer path 3. In other words, the invention realizes the sole second antenna unit 17 to perform both the function of an antenna for data communication with the card 210 brought close to or in contact with (placed on) the card access area 2 and a function of antenna for data communication with the card 210 transferred through the card transfer path 3, so as to reduce a number of components and to realize a reduction in size of the equipment.

A circuit board 18 is provided at an upper part of the body cover 1, and a circuit, which comprises a control means (an integrated circuit ("IC") such as a CPU, etc.) for controlling each unit, etc., is formed on the circuit board 18.

Figure 4A:
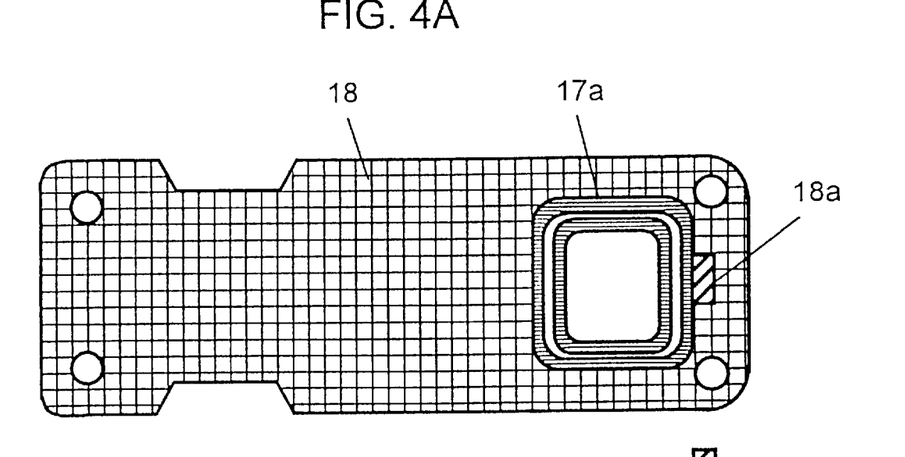
Figure 4B:
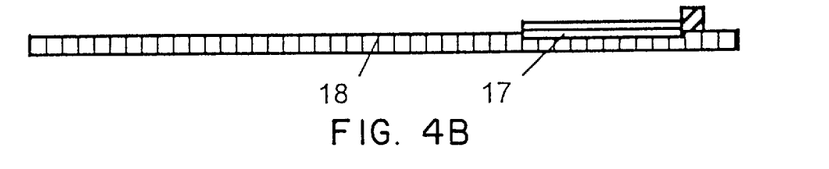
FIG. 4B is a side view showing a circuit board and an antenna unit which are suitable for use in the card reader of the preferred embodiment of the present invention.

FIG. 4A shows a plan view and FIG. 4B shows a side view of a circuit board 18 for use with the card 210 of FIG. 3A. In FIG. 4A, a second antenna unit 17a in a coil form is composed on the circuit board 18, which enables space to be saved and the size of the equipment to be reduced. Moreover, the second antenna unit 17a can be constructed integrally with the circuit board 18, thereby improving productivity. An IC 18a is provided on the circuit board 18 for converting at least one of signals transmitted from and received by the second antenna 17a into data, and for storing the same.

Figure 4C:
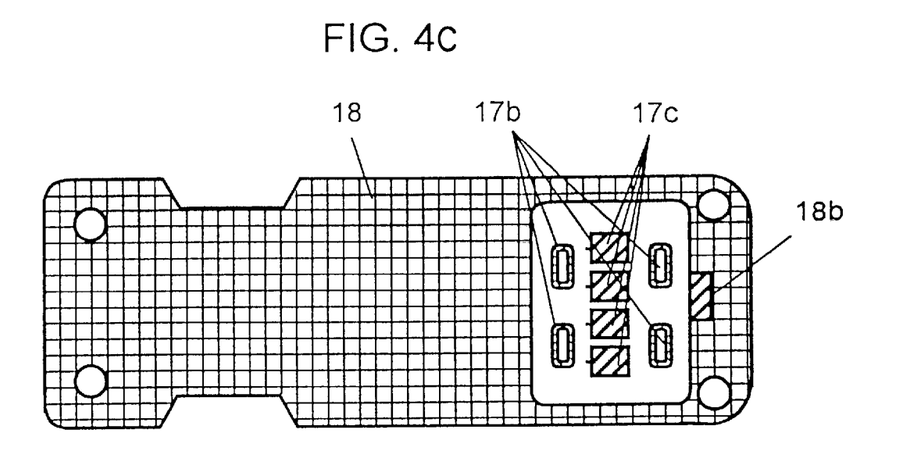
Figure 4D:
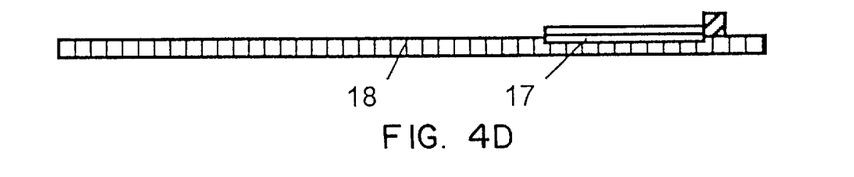
FIG. 4D is a side view showing another circuit board and an antenna unit which are suitable for use in the card reader of the preferred embodiment of the present invention.

FIGS. 4C and 4D depict a circuit board 18 for use with the card 210 of the second structure conforming to the previously noted ISO standard. The second antenna unit 17 comprises coil units 17b and electrostatic capacitors 17c, as shown in FIG. 4C. An IC 18b is provided on the circuit board 18 for converting at least one of signals transmitted from and received by the second antenna 17 into data, and for storing the same.

Figure 5:
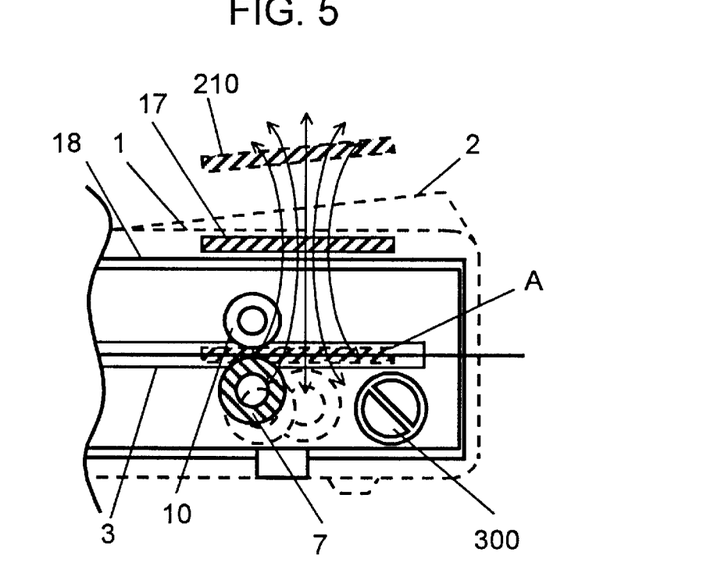
FIG. 5 is a fragmentary cross sectional side view showing an exemplary card reader, in which a circuit board is positioned between a card transfer path and a second antenna unit, in a preferred embodiment of the present invention.
Figure 6:
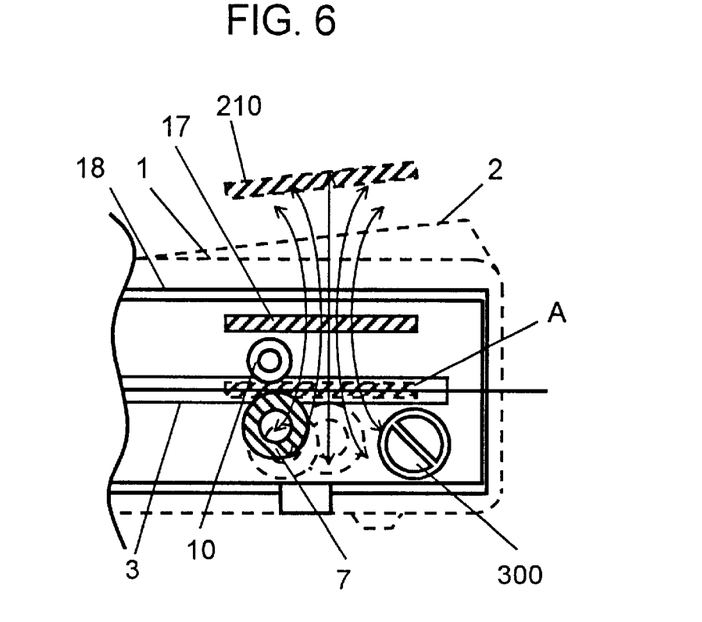
FIG. 6 is a fragmentary cross sectional side view showing an exemplary card reader, in which a second antenna unit is positioned between a circuit board and a card transfer path, in a preferred embodiment of the present invention.

Referring to FIG. 5 and FIG. 6, a location of the second antenna unit 17 is now described.

In FIG. 5, the circuit board 18 is positioned between the card transfer path 3 and the second antenna unit 17. By positioning the second antenna unit 17 in the vicinity of the card access area 2, reliability is improved when performing at least one of transmitting and receiving signals with the card 210 which is brought close to or in contact with (placed on) the card access area 2. Especially when the card 210 is brought close to the card access area 2 by an operator, the distance between the card access area 2 and the cards 210 increases substantially, and there is a large possibility of causing an error in transmission and reception of the signals. However, the second antenna unit 17 positioned closer to the card access area 2 than the card transfer path 3 and thus the probability of causing the error in exchanging signals with the card 210 brought close to the card access area 2 is reduced. On the other hand, this increases inversely a distance between the second antenna unit 17 and the card transfer path 3 which obviously lowers the reliability of communication with the card 210 transferred in the card transfer path 3. But this problem can be easily resolved by appropriately adjusting the strength of the magnetic field as well as the electrostatic field generated by the second antenna unit 17 based on the actual distance between the card transfer path 3 and the second antenna unit 17, since the distance between the second antenna unit 17 and the card transfer path 3 is invariably stable. Also, if the communication with the card 210 transferred in the card transfer path 3 is still unreliable due to the circuit board 18, which is located between the card transfer path 3 and the second antenna unit 17, even after an increase of the magnetic field and the electrostatic field generated by the second antenna unit 17, the problem can be resolved by providing the circuit board 18 with an opening in an area which faces the second antenna unit 17.

In FIG. 6, the second antenna 17 is positioned between the circuit board 18 and the card transfer path 3. In this instance, a reliability of communication with the card 210 in the card transfer path 3 is increased because the second antenna unit 17 is positioned closer to the card transfer path 3 than the card access area 2. However, there is a concern in this case that, due to an increased distance to the second antenna unit 17, reliability will be decreased in communication at the card access area 2, where a distance between the second antenna unit 17 and the card 210 is large. This problem can be effectively solved by strengthening the magnetic field and the electrostatic field generated by the second antenna unit 17 or by providing the circuit board 18 with an opening in an area which faces the second antenna unit 17.

Figure 8:
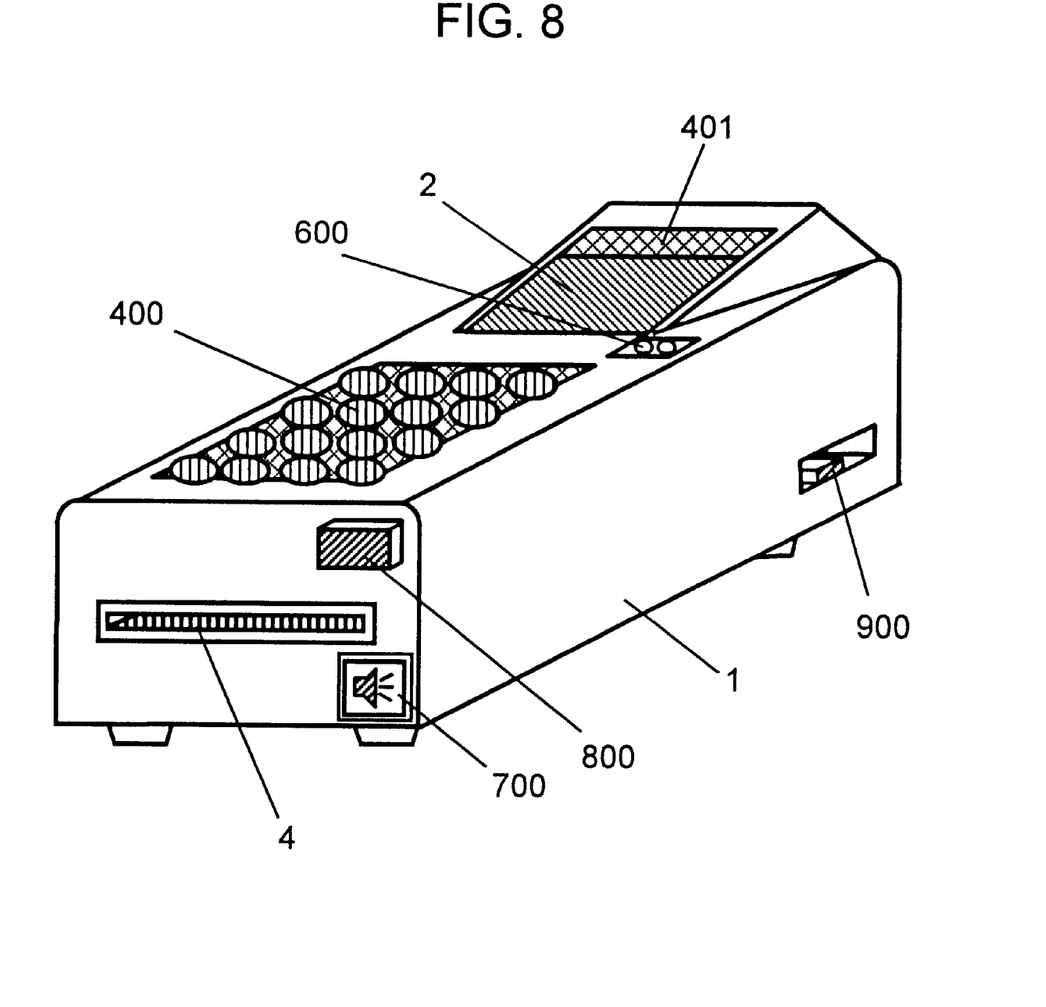
FIG. 8 is a perspective view showing an exterior of a card reader constructed in accordance with a preferred embodiment of the present invention.

An exterior view of the card reader is described with reference to FIG. 8. The body cover 1 can be provided with a keyboard 400 for inputting predetermined data and a display 401. The keyboard 400 accepts an input of data such as a control number of merchandise, a control number of an operator, date, a purchase price, etc., for example. Although the keyboard 400 is shown in the example of FIG. 8 as an input device for data, a handwriting-input device, a touch panel or a voice-activating input device may alternatively be used. Also, the display 401 indicates such information as name of an operator, an identification number, the time of day, description of purchased merchandise, a latest score of points, etc. The display 401 can be any one of a liquid crystal display, an organic electro-luminescent display, an electro-luminescent display, cathode-ray tube display, etc.

In addition, a display means 600 may be provided on the body cover 1 for visual verification of the communicating condition between the wireless communication means and the card, as shown in FIG. 8. At least one light emitting diode ("LED") may be used for the indication means. If a green LED and a red LED are used, for example, they can be operated so that the green LED flashes while communication continues between the card and the wireless communication means, the green LED lights upon successful completion of the communication between the card and the wireless communication means, and the green LED turns off and the red LED turns on if an error occurs in the communication between the card and the wireless communication means, so as to allow the operator to readily and visually recognize a completion of communication and a communication error between the card and the wireless communication means.

A sound generation means 700 can also be provided in the body cover 1 for aural verification of the communicating condition between the wireless communication means and the card. At least one buzzer can be used as an example of the sound generation means. If, for example, the buzzer is operated so that it remains silent when communication is successfully completed between the card and the wireless communication means, and it sounds if a communication error occurs between the card and the wireless communication means, so as to allow the operator to readily and aurally recognize a completion and an error in communication between the card and the wireless communication means.

A discharge means can be provided for discharging the card from the card transfer path 3, when communication is successfully completed between the wireless communication means and the card inserted in the card transfer path 3. The discharge means operates in a reverse direction of the direction in which the card is transferred from the card insertion port 4, as shown in FIG. 1. The card transfer path 3 is provided with card transfer rollers 5, 6 and 7, and these card transfer rollers are driven so as to rotate in the reverse direction by the driving means including the motor 300 provided in the body cover 1. During this operation, a driving force of the motor 300 is transmitted to the card transfer rollers 5, 6 and 7 by a gear, a belt, etc. which are not shown in the figures. Each of the card transfer rollers 5, 6 and 7 is provided with opposing driven rollers 8, 9 and 10, respectively. The card 210 is transferred in the card transfer path 3 by being held between the card transfer rollers 5, 6 and 7 and the driven rollers 8, 9 and 10, and is discharged to the card insertion port 4. A provision of the discharge means substantially improves the usefulness.

An activation means 800 such as a button switch can also be provided on the body cover 1, as shown in FIG. 8, for activating the discharge means, when communication is completed between the wireless communication means and the card inserted in the card transfer path 3. For instance, an operator pushes the button switch to activate the discharge means to have the card discharged at the card insertion port 4, when he perceives an orderly completion of communication between the card and the wireless communication means by one of the above described means. A provision of the activation means 800 for discharging the card allows the operator to have a strong recognition for a validity of the data processing.

Furthermore, a switch means 900 can be provided for selecting whether the discharge means is activated automatically or it is activated by the activation means 800 provided on the body cover, when communication is completed between the wireless communication means and the card inserted in the card transfer path 3. A selector switch may be used for the switch means. The selector switch is for selecting between two modes designated as, for instance, an AUTO mode and a MANUAL mode, and the owner of the card reader can turn the selector switch to the AUTO mode if he desires to discharge the card automatically, or to the MANUAL mode if he desires to discharge the card manually. Alternatively, instead of providing the selector switch for a mechanical switch means, software can be provided for making a determination of the AUTO-MANUAL selection upon orderly completion of communication between the card and the wireless communication means. In this case, the mechanical selector switch is not required. A provision of the switch means can realize a multifunctional card reader according to the utility.

Figure 7:
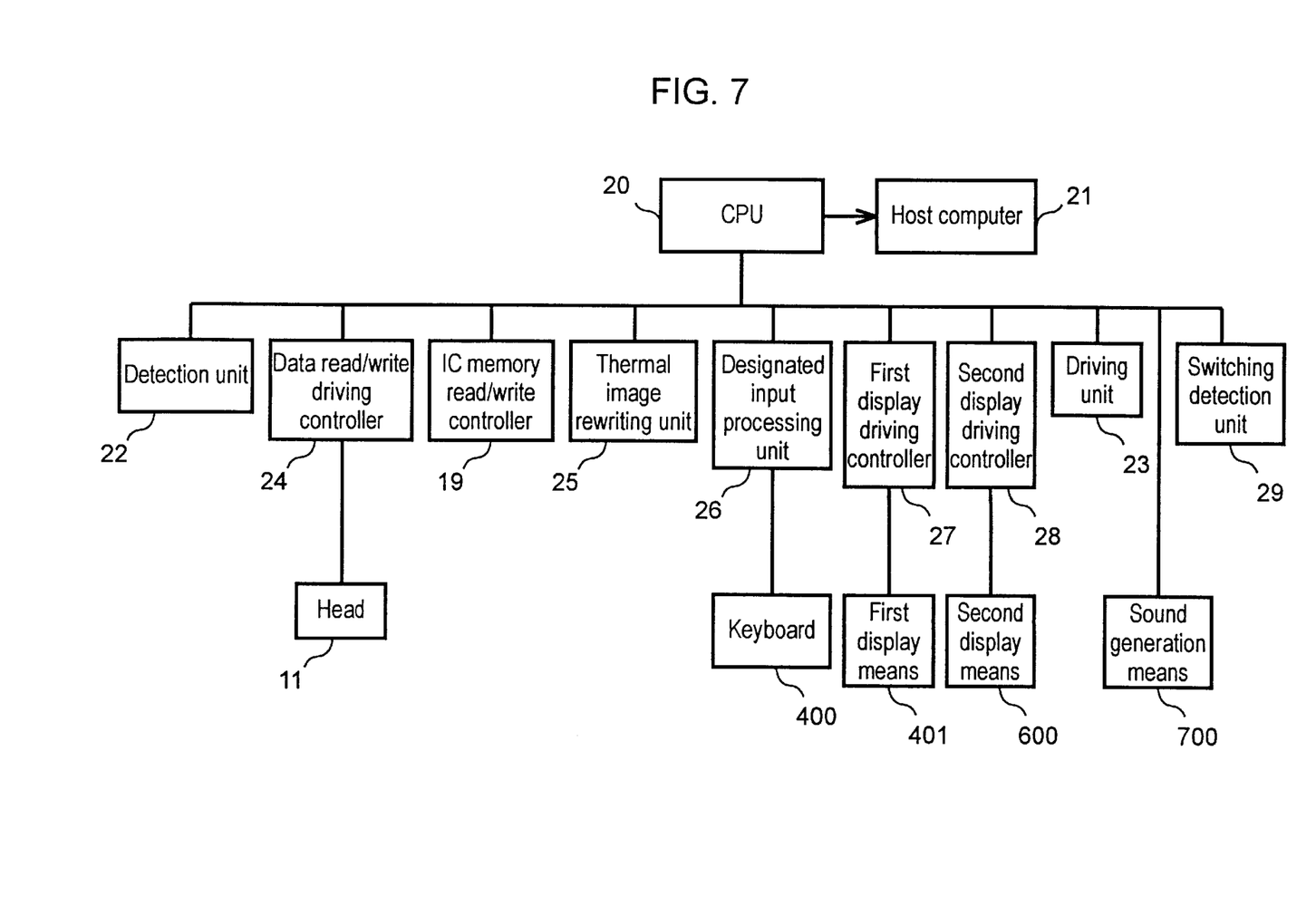
FIG. 7 is a block diagram showing an operational card reader of a preferred embodiment of the present invention.

The card reader constructed as above operates in a manner, which is described hereinafter with reference to the figures with the focus placed on FIG. 7. For the following description, a card 210 of the first structure is used. While the card 210 of the second structure differs from that of the first structure with respect to generation of both a magnetic field and an electrostatic field in lieu of the magnetic field, the operation of the card reader remains the same.

First, an IC memory read/write controller 19 (FIG. 7) supplies a current to the second antenna unit 17 to generate a magnetic field. The first antenna unit 201a provided in the card 210 (FIG. 3A), brought in close proximity of or in contact with the card access area 2 receives the magnetic field generated by the second antenna unit 17. The first antenna unit 201a carries out erasing, revising, etc. of data stored in the memory within the IC 202a. Also, the card 210 transmits information of the IC 202a to the second antenna unit 17 through the first antenna unit 201a, if necessary, so as to be able to transfer predetermined information or data to a central processing unit ("CPU") 20 on the circuit board 18. During this process, the CPU 20 transfers the accepted data to a host computer 21 that aggregates the data. When writing data of the host computer 21 into the IC 202a in the card 210, the CPU 20 transfers a signal corresponding to the data to the IC memory read/write controller 19, which, in turn, causes the second antenna unit 17 to generate a predetermined magnetic field for writing the data in the IC 202a within the card 210.

When the card 210, inserted into the card insertion port 4, is detected by a sensor (an optical sensor using a photocoupler, etc. is most preferable), which is not shown in the figures, a detection unit 22 (FIG. 7) transmits a detection signal to the CPU 20. The CPU 20 outputs a driving signal to a drive unit 23 based on the detection signal. The drive unit 23 drives the motor 300 (FIG. 1) according to the driving signal, so as to drive the card transfer rollers 5, 6 and 7 and the platen rollers 14 and 16 to rotate in order to transfer the card 210 through the card transfer path 3. If the card 210 is provided with a recording medium such as a magnetic stripe, the CPU 20 transmits a predetermined signal to a data read/write driving controller 24 to drive the head 11 for executing at least one of reproducing data from and recording data to the recording medium with the head 11.

After the operation, the card 210 is transferred further into the card transfer path 3. When the detection unit 22 detects that the card 210 is transferred to a position where the card directly opposes the second antenna unit 17 based on an output from a sensor, etc., which is not shown in the figures, the detection unit 22 sends a signal to the CPU 20. The CPU transmits a signal to the drive unit 23 based on the signal from the detection unit 22, and the drive unit 23 stops rotation of the motor 300. The IC memory read/write controller 19 is then operated to exchange signals by receiving the magnetic field generated by the second antenna unit 17 with the first antenna unit 201a provided in the card 210, and vice versa. The IC memory read/write controller 19 detects completion of at least one operation of recording data in the card 210 and reproducing signals from the card 210. The IC memory read/write controller 19 determines whether communication with the card 210 has been completed or has failed, by verifying the detected signal. The IC memory read/write controller 19 sends a signal of the verified data to the CPU 20. When the CPU 20 receives the signal, it sends data to be displayed to a second display driving controller 28 after judging the information in the forwarded signal (whether the communication is completed or failed) so as to have it displayed in the second display means 600. The CPU 20 also sends a signal to the sound generation means 700 to have the sound generation means 700 generate a sound.

The CPU 20 outputs a signal thereafter to the driving unit 23 to rotate the motor 300 in the reverse direction, so as to drive the card transfer rollers 5, 6 and 7 and the platen rollers 14 and 16 in a reverse direction of rotation in order to have the card 210 transferred back toward the card insertion port 4. In this operation, the signal provided by the CPU 20 to the driving unit 23 is based on a signal from a switching detection unit 29, which defines a switching means for selecting an activation of the discharge means either automatically or by the activating means provided on the body cover 1. When transferring the card 210 toward the card insertion port by driving the motor in the reverse direction, if the card 210 is provided with an image recording area formed of a rewritable material, and if the pattern in the image recording area needs to be rewritten, the CPU 20 outputs a signal to a thermal image rewriting unit 25 for driving the erasing head 15 and the image formation unit 13 according to the signal. First, at least the image recording area of the card 210 is heated to a predetermined temperature by holding the card 210 with the erasing head 15 and the platen roller 16, so as to erase the pattern, etc. recorded in the image recording area. Then the card 210 is transferred toward the image formation unit 13, and the image formation unit 13 heats the image recording area to visibly display a predetermined pattern, etc. Finally, the card 210 is transferred toward the head 11 for carrying out at least one of recording and reproducing data with the head 11 as needed, if the card 210 is provided with the recording medium.

Input data from the keyboard 400 is sent to the CPU 20 through a designated input processing unit 26, and the data is examined by the CPU 20. If it is necessary to forward the data to the host computer 21 according to a result of the examination, the data is transferred to the host computer 21, and if it is necessary to record the data in the recording medium on the card 210 as a result of the examination, the data is transferred to the data read/write driving controller 24 in order to have the data recorded in the recording medium on the card 210 with the head 11. Also, if it is necessary to forward the data to the IC 202*a* in the card 210 as a result of the examination, the data is sent to the IC memory read/write controller 19 to have the second antenna unit 17 output a magnetic field corresponding to the signal, so as to record the data in the IC 202*a* in the card 210.

Furthermore, the CPU 20 examines information sent to it (the information such as data from the head 11, data from the keyboard 400, data from the host computer 21, etc.), and forwards the data to be displayed to a first display driving controller 27 in order to have it displayed on the first display means 401, if such display is necessary.

Since the operation described above is just an example, other operations are also practicable as a matter of course, and individual operation needs to be established each time, as it varies depending on the system, etc. that uses the card 210.

Also, because the structures shown in FIG. 1 through FIG. 8 are provided with a power supply circuit and the like positioned under the card transfer path 3, although not explicitly shown in the figures, the thickness of the card reader is quite thick. Accordingly, the card reader can be constructed as shown in FIG. 9 and FIG. 10, if a thin card reader is desired.

Figure 9:
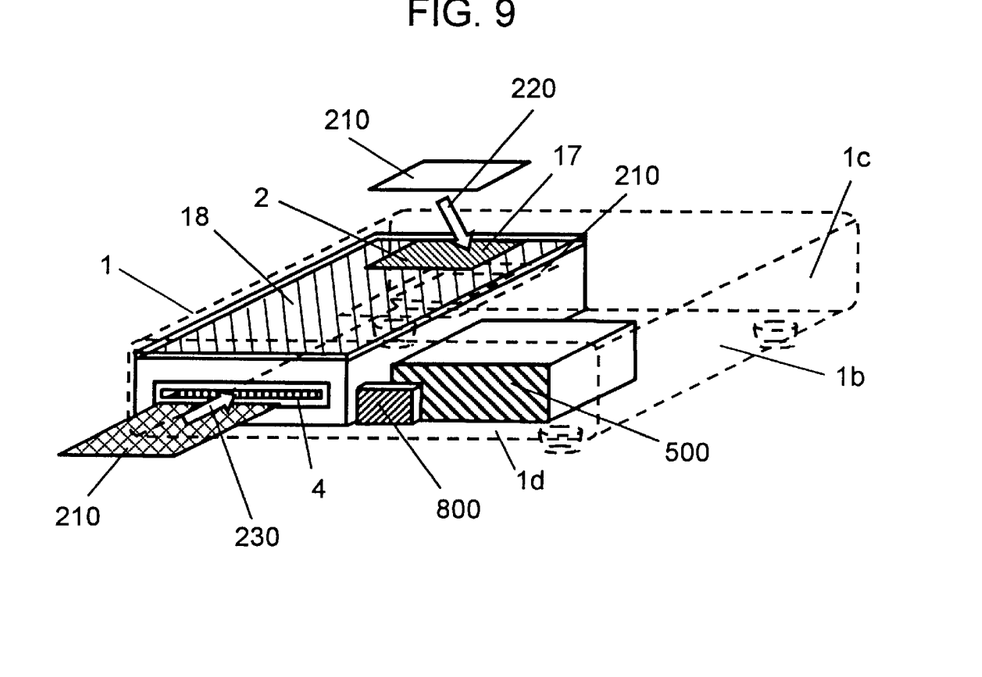
FIG. 9 is a perspective view showing an interior of another exemplary card reader of a preferred embodiment of the present invention.
Figure 10:
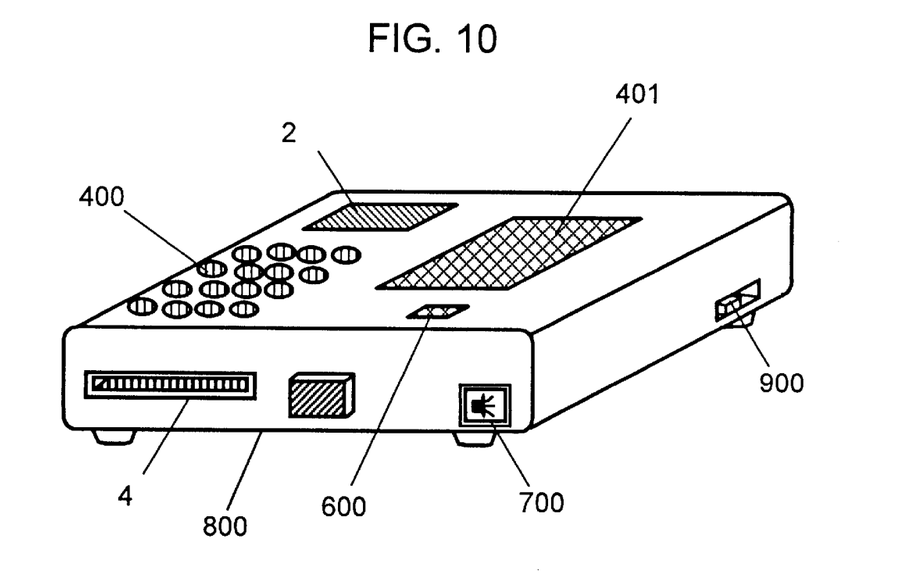
FIG. 10 is a perspective view showing an exterior of the card reader shown in FIG. 9.

In other words, the card reader shown in FIG. 9 is the same as those shown in FIG. 1 through FIG. 8, with respect to each component, the driving system, and the operation for recording and reproducing data. Since the card reader shown in FIG. 9 is provided with a power supply unit 500 at a side of the card transfer path 3 in body cover 1, this structure can remarkably reduce the entire thickness of the card reader. By pressing a discharge button switch 800, which defines a card discharge means provided on the body cover 1, the card 210 can be retrieved from the card insertion port 4. Also, because the power supply unit 500 is positioned at a side of the card transfer path 3, the body cover 1 can be formed in a rectangular parallelepiped shape, which yields the following effects. That is, the card reader becomes very useful since it allows many ways of installation suitable for various locations such as placing it with a bottom face 1*b* of the body cover 1 down, or with a first side face 1*c* of the body cover 1 down. It is also very useful upon consideration of a way of installation for the body cover 1 as described above, if the card insertion port 4 is arranged at one end of a second side face 1*d*, namely a front face 1*d*. In other words, the card insertion port 4 is located at one end of the card reader, where it is readily accessible, even if the card reader is placed with the bottom face 1*b* down or the first side face 1*c* down, so as to facilitate insertion of a card by an operator.

As has been described, a card reader of the present invention is internally provided with a wireless communication means for exchanging data with a card in wireless transmission and a card transfer path within its body cover. Accordingly, the card reader is capable of exchanging data in wireless transmission by bringing the card in close proximity to the body cover or by having a card pass through the card transfer path, both within one body. With this structure, the card reader is able to communicate data in a single unit by simply bringing the card near the main body and also by passing the card through the card transfer path. Therefore, communication with the card is carried out by simply bringing the card near the main body if only the communication of data is intended, and it can write visible information on the card or record new data in the card by inserting it into the card transfer path when desired.

REFERENCE NUMERALS

1 Body cover
1*a* Top face of body cover 1
1*b* Bottom face of body cover 1
1*c* First side face of body cover 1
1*d* Second side face of body cover 1 (front face)
2 Card access area
3 Card transfer path
4 Card insertion port
5, 6, 7 Card transfer rollers
8, 9, 10 Driven rollers
11 Head
12 Driven roller
13 Image formation unit
14, 16 Platen rollers
15 Erasing head
17 First antenna unit
17*a*, 17*b* Coil units (antenna units)
17*c* Electrostatic capacitor
18 Circuit board 18a, 18b Integrated circuit elements (IC's)
19 IC Memory read/write controller
20 Central processing unit (CPU)
21 Host computer
22 Detection unit
23 Driving unit
24 Data read/write driving controller
25 Thermal image rewriting unit
26 Designated input processing unit
27 First display driving controller
28 Second display driving controller
29 Switching detection unit
210 Card
401 First display means
500 Power supply unit
600 Second display means
700 Sound generation means
800 Card discharge activation means
801 Discharge button switch
900 Switch means
201a, 201b First antenna units
202a, 202b Integrated circuit elements (IC's)
203b Electrostatic capacitor
300 Motor
400 Keyboard
401 Display

What is claimed is:

1. A card reader comprising:
   a body cover;
   a card transfer path defined within said body cover;
   a transfer means for transferring a card inserted in said card transfer path; and
   a wireless communication means provided in said body cover for communicating with the card in wireless transmission, said wireless communication means comprising an antenna unit positioned between said card transfer path and an inner side of said body cover such that said antenna unit opposes said card transfer path;
   wherein communication can be executed between a card antenna unit contained on the card and said antenna unit of said wireless communication means by inserting the card in said transfer path, and also by bringing the card into close proximity to said body cover.

2. The card reader according to claim 1, wherein the communication can be achieved by at least one of a magnetic field and an electrostatic field.

3. The card reader according to claim 1, further comprising a circuit board provided between said card transfer path and a surface of said body cover, wherein said antenna unit is provided on said circuit board.

4. The card reader according to claim 1, further comprising a head for executing at least one of recording data and reproducing data with the card, besides communication between said antenna unit and the card antenna unit contained on the card.

5. The card reader according to claim 1, further comprising an image formation means provided in said body cover for generating a visual pattern on an image recording area of the card.

6. The card reader according to claim 5, wherein the image recording area on the surface of the card comprises a heat reversible-heat sensitive material, and said image formation means comprises an image formation unit for visually displaying a predetermined pattern on the image recording area and an erasing head for erasing visual data displayed on the image recording area.

7. The card reader according to claim 1, further comprising a card access area on said body cover, wherein said card access area opposes said antenna unit and is formed on said body cover so as to be visually discernible.

8. The card reader according to claim 7, wherein said card access area is slanted relative to an upper surface of said body cover so as to be distinguishable from other portions of said body cover.

9. The card reader according to claim 7, wherein said card access area is formed so as to be at a different level relative to other portions of said body cover.

10. The card reader according to claim 7, wherein said card access area is marked with printed indicia.

11. The card reader according to claim 1, further comprising a power supply unit provided within said body cover, wherein said power supply unit is positioned at a side of said card transfer path.

12. The card reader according to claim 11, wherein said body cover is of a generally rectangular parallelepiped shape, and both a bottom face and a first side face of said body cover are usable as a support surface of said card reader, said bottom face forming a larger surface area of said body cover relative to said first side face.

13. The card reader according to claim 12, wherein a card insertion port is provided on a second side face of said body cover, and said card insertion port is located at one end of said second side face.

14. The card reader according to claim 1, further comprising a card access area on said body cover, wherein said card access area opposes said antenna unit and is configured in a shape that is capable of supporting the card, so that when the card is placed on said card access area the card can communicate with said antenna unit.

15. The card reader according to claim 1, wherein said body cover is provided with an input means for inputting data, and a display means for displaying information including at least one of the time of day, an identification number of an operator, a number of points, and data stored in the card.

16. The card reader according to claim 1, wherein said body cover is provided with a display means for indicating a communicating condition between said antenna unit and the card antenna unit so as to provide visual verification thereof.

17. The card reader according to claim 1, wherein a sound generation means is provided within said body cover for generating an audible signal to indicate a communicating condition between said antenna unit and said card antenna unit for aural verification thereof.

18. The card reader according to claim 1, further comprising a discharge means for discharging the card from said card transfer path upon completion of communication between the card inserted in said card transfer path and said antenna unit.

19. The card reader according to claim 18, further comprising an activation means provided on said body cover for activating said discharge means when the communication is completed between said card inserted in said card transfer path and said antenna unit.

20. The card reader according to claim 19, further comprising a switch means for selecting whether said discharge means is activated automatically or it is activated by manipulation of said activation means provided on said body cover when communication is completed between said card inserted in said card transfer path and said antenna unit.

* * * * *